(12) United States Patent
Lin et al.

(10) Patent No.: US 8,351,125 B2
(45) Date of Patent: Jan. 8, 2013

(54) DIRECTIONAL LIGHT DISTRIBUTED OPTICAL ELEMENT AND DIRECTIONAL LIGHT DISTRIBUTED OPTICAL ASSEMBLY

(75) Inventors: Hui-Hsiung Lin, Miaoli County (TW); Wen-Hsun Yang, Taipei (TW); Chin-Ju Hsu, Tainan (TW); Yu-Nan Pao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/019,420

(22) Filed: Feb. 2, 2011

(65) Prior Publication Data
US 2012/0147475 A1 Jun. 14, 2012

(30) Foreign Application Priority Data
Dec. 10, 2010 (TW) ................ 99143296 A

(51) Int. Cl.
*G02B 27/30* (2006.01)
*G02B 5/04* (2006.01)
*G02B 3/08* (2006.01)
*F21V 7/04* (2006.01)

(52) U.S. Cl. ........ 359/641; 359/615; 359/708; 359/711; 359/719; 359/741; 359/742; 359/743; 362/268; 362/326; 362/617

(58) Field of Classification Search .............. 359/641, 359/708, 711, 712, 718, 719, 728, 793, 794, 359/800, 868, 869; 362/217.07, 97.2, 326–328, 362/333, 335, 612, 620, 293, 800, 311, 310, 362/339, 516, 268, 606–609; 313/504, 512; 385/31–34, 46, 146; 257/95, 97, 98
See application file for complete search history.

(56) References Cited

U.S. PATENT DOCUMENTS
4,767,172 A * 8/1988 Nichols et al. ............ 385/146
(Continued)

FOREIGN PATENT DOCUMENTS
CN 201310816 Y 9/2009
(Continued)

OTHER PUBLICATIONS
Parkyn W.A., et al., Compact Non-Imagine Lens with Totally Internally Reflecting Facets, Proc. SPIE, 1991, pp. 70-81, vol. 1528, Nonimaging Optics: Maximum Efficiency Light Transfer.
(Continued)

*Primary Examiner* — Loha Ben
(74) *Attorney, Agent, or Firm* — Morris Manning & Martin LLP; Tim Tingkang Xia, Esq.

(57) ABSTRACT

A directional light distributing optical element includes a light incident surface and a light emission curved surface. The light incident surface receives a light emitted by a light source. The light emission curved surface and a first plane are intersected to form a first curve. The first curve has a plurality of first curve segments, and each first curve segment includes at least three first tangent points. After passing each first tangent point along a connecting line of the light source and each first tangent point, the light exits along a first axis, and an included angle formed between the first axis and an optic axis is greater than −15° and smaller than 15°. Thus, the light after passing the directional light distributing optical element forms a one-dimensional directional light.

18 Claims, 10 Drawing Sheets

U.S. PATENT DOCUMENTS

| | | | | |
|---|---|---|---|---|
| 4,770,514 | A * | 9/1988 | Silverglate | 359/728 |
| 5,485,317 | A * | 1/1996 | Perissinotto et al. | 359/712 |
| 5,526,190 | A * | 6/1996 | Hubble et al. | 359/719 |
| 5,742,438 | A | 4/1998 | Conner et al. | |
| 5,757,557 | A * | 5/1998 | Medvedev et al. | 359/708 |
| 5,801,889 | A * | 9/1998 | Meyers et al. | 359/743 |
| 5,894,195 | A * | 4/1999 | McDermott | 313/512 |
| 6,102,545 | A * | 8/2000 | Ogino | 353/38 |
| 6,130,777 | A * | 10/2000 | Yamashita et al. | 359/456 |
| 6,400,905 | B1 * | 6/2002 | Tenmyo | 396/175 |
| 6,547,423 | B2 | 4/2003 | Marshall et al. | |
| 6,558,032 | B2 * | 5/2003 | Kondo et al. | 362/516 |
| 7,333,276 | B2 * | 2/2008 | Ikuno et al. | 359/800 |
| 7,580,192 | B1 | 8/2009 | Chu et al. | |
| 7,619,836 | B2 * | 11/2009 | Minakawa et al. | 359/794 |
| 7,674,031 | B2 * | 3/2010 | Sung et al. | 362/624 |
| 2008/0092879 | A1 | 4/2008 | Minano Dominguez et al. | |

FOREIGN PATENT DOCUMENTS

TW    I254172    5/2006

OTHER PUBLICATIONS

Ning XH, et al., Dielectric Totally Internally Reflecting Concentrators, Applied Optics, 1987, pp. 300-305, vol. 26, Issue 2.

Parkyn W.A., Uniformly Illuminating Dual-Lens System for LED Collimation, Proc. SPIE, 2002, pp. 232-238, vol. 4446, Nonimaging Optics: Maximum Efficiency Light Transfer VI.

Yang W.H., One Dimensional Coupler Lens for LED Collimation, FMCp-3, 2010, pp. 813-816, ISSN-L 1883-2490/17/0813, 2010 ITE and SID.

Yang W.H., One Dimensional Coupler Lens for LED Collimation, Poster/A.I.Room, Dec. 2, 2010, Industrial Technology Research Institute, Hsinchu, Taiwan 310, Republic of China.

* cited by examiner

DIRECTIONAL LIGHT DISTRIBUTED OPTICAL ELEMENT AND DIRECTIONAL LIGHT DISTRIBUTED OPTICAL ASSEMBLY

CROSS-REFERENCE TO RELATED APPLICATIONS

This non-provisional application claims priority under 35 U.S.C. §119(a) on Patent Application No(s). 099143296 filed in Taiwan, R.O.C. on Dec. 10, 2010, the entire contents of which are hereby incorporated by reference.

BACKGROUND OF THE INVENTION

1. Field of the Invention

The present invention relates to an optical element and an optical assembly, and more particularly to a directional light distributing optical element and a directional light distributing optical assembly.

2. Related Art

Due to the advantages of light, thin, and low power consumption, the Liquid Crystal Display (LCD) is widely applied to portable electronic devices such as a notebook computer, a mobile phone, and a Personal Digital Assistant (PDA). However, the liquid crystal does not have the characteristic of luminescence, so the LCD needs a light-emitting device to realize the display function.

Currently, the color filter of the LCD in the prior art adopts the manner of absorbing and generating red, green, blue lights, and this manner will cause the substantial decrease of the using rate of the energy. To solve the above problem, a new LCD architecture design technique is gradually popularized.

Generally speaking, when a divergence angle of an incident light of a light source (hereinafter referred to as a backlight source for short) of a backlight module is too large, the light of various colors cannot be accurately incident on the subpixel of the liquid crystal to generate a color mixture phenomenon of a cross-talk (that is, the picture on a certain region of the display influencing the brightness of the adjacent region), such that the color saturation of the light after passing the panel is greatly reduced. In addition to generating a uniform directional light, the backlight source must reach the 70%-80% uniformity of the light, so the light source is required to be kept approximately parallel in one dimension and dispersed in another dimension at 90° different from the one dimension.

Since the backlight source in the LCD has a high requirement for collimation, the packaging technique of the general Light-Emitting Diode (LED) cannot meet the collimation requirement of the backlight source.

SUMMARY OF THE INVENTION

Accordingly, the present invention provides a directional light distributing optical element and a directional light distributing optical assembly, thereby achieving the collimation requirement of the backlight source in the LCD.

According to the present invention, the optical element is used to receive a light emitted by a light source. The light source comprises an optic axis. In an embodiment, the directional light distributing optical element comprises a light incident surface and a light emission curved surface, and the light incident surface comprises a central axis and receives a light. The light emission curved surface and a first plane being vertical to the central axis are intersected to form a first curve. The first curve has a plurality of first curve segments, and each first curve segment comprises at least three first tangent points. After passing each first tangent point along a connecting line of a light source and each first tangent point, the light exits along a first axis. The included angle formed between the first axis and the optic axis is greater than −15° and smaller than 15°, and each first tangent point satisfies $$M_x = \tan\theta = \tan\left(\sin^{-1}\left(\frac{n_1}{n_2}\sin A_x\right)\right).$$

$M_x$ is a tangent slope at each first tangent point, $\theta$ is an included angle formed between the first axis and a normal line of each first tangent point, $A_x$ is an included angle formed between a connecting line of each first tangent point and a light source and the optic axis, $n_1$ is a refractive index of the directional light distributing optical element, and $n_2$ is a refractive index of an ambient environment in which the directional light distributing optical element is disposed.

In the directional light distributing optical assembly according to an embodiment of the present invention, the directional light distributing optical assembly comprises at least one light source and a directional light distributing optical element. The light source comprises an optic axis and provides a light. The directional light distributing optical element comprises a light incident surface and a light emission curved surface, and the light incident surface comprises a central axis and receives a light. The light emission curved surface and a first plane being vertical to the central axis are intersected to form a first curve. The first curve has a plurality of first curve segments, and each first curve segment comprises at least three first tangent points. After passing each first tangent point along a connecting line of a light source and each first tangent point, the light exits along a first collimation axis. The included angle formed between the first axis and the optic axis is greater than −15° and smaller than 15°, and each first tangent point satisfies:

$$M_x = \tan\theta = \tan\left(\sin^{-1}\left(\frac{n_1}{n_2}\sin A_x\right)\right).$$

$M_x$ is a tangent slope at each first tangent point, $\theta$ is an included angle formed between the first collimation axis and a normal line of each first tangent point, $A_x$ is an included angle formed between a connecting line of each first tangent point and a light source and a optic axis, $n_1$ is a refractive index of the directional light distributing optical element, and $n_2$ is a refractive index of an ambient environment in which the directional light distributing optical element is disposed.

The directional light distributing optical element according to the present invention uses the first curve design and a light emission curved surface forming manner to make the light emitted by the light source pass the directional light distributing optical element and then generate a one-dimensional directional light. By designing the light emission curved surface into the Fresnel lens, the volume of the directional light distributing optical element is reduced, such that the directional light distributing optical assembly may be applied to a small device. The directional light distributing optical assembly according to the present invention is applicable to the new LCD architecture, and is also applicable to display devices which have a high requirement for light source collimation, such as a 3D display and a dual-view display.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
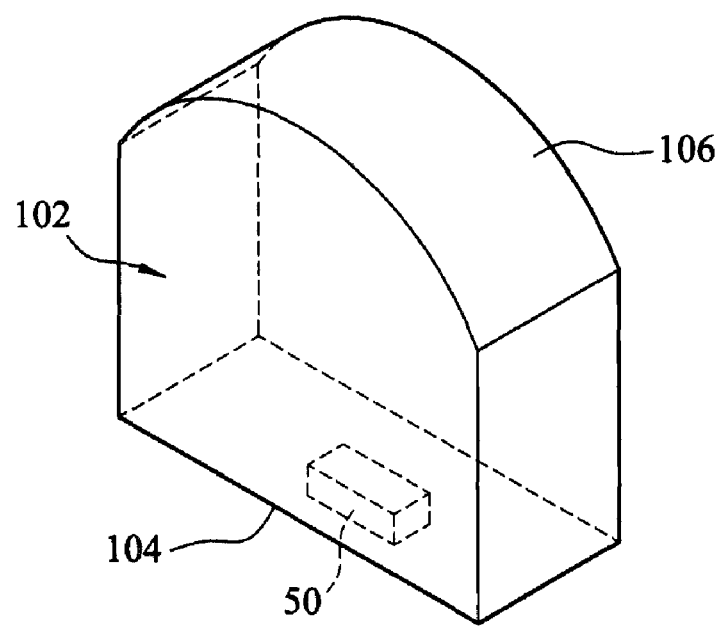
FIG. 1A is a schematic three-dimensional view of a directional light distributing optical assembly according to an embodiment of the present invention.

FIG. 1A is a schematic three-dimensional view of a directional light distributing optical assembly according to an embodiment of the present invention. The directional light distributing optical assembly 100 comprises a light source 50 and a directional light distributing optical element 102. The number of the light source 50 may be but not limited to one, and the number of the light source may be adjusted according to the actual requirement. The light source 50 comprises an optic axis 51 (see FIG. 1C) for providing a light 52, and the directional light distributing optical element 102 is used to receive the light 52 emitted by the light source 50. The directional light distributing optical element 102 comprises a light incident surface 104 and a light emission curved surface 106.

Figure 1B:
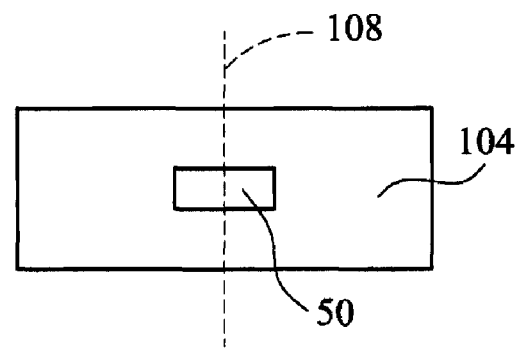
FIG. 1B is a schematic structural bottom view of FIG. 1A.
Figure 1C:
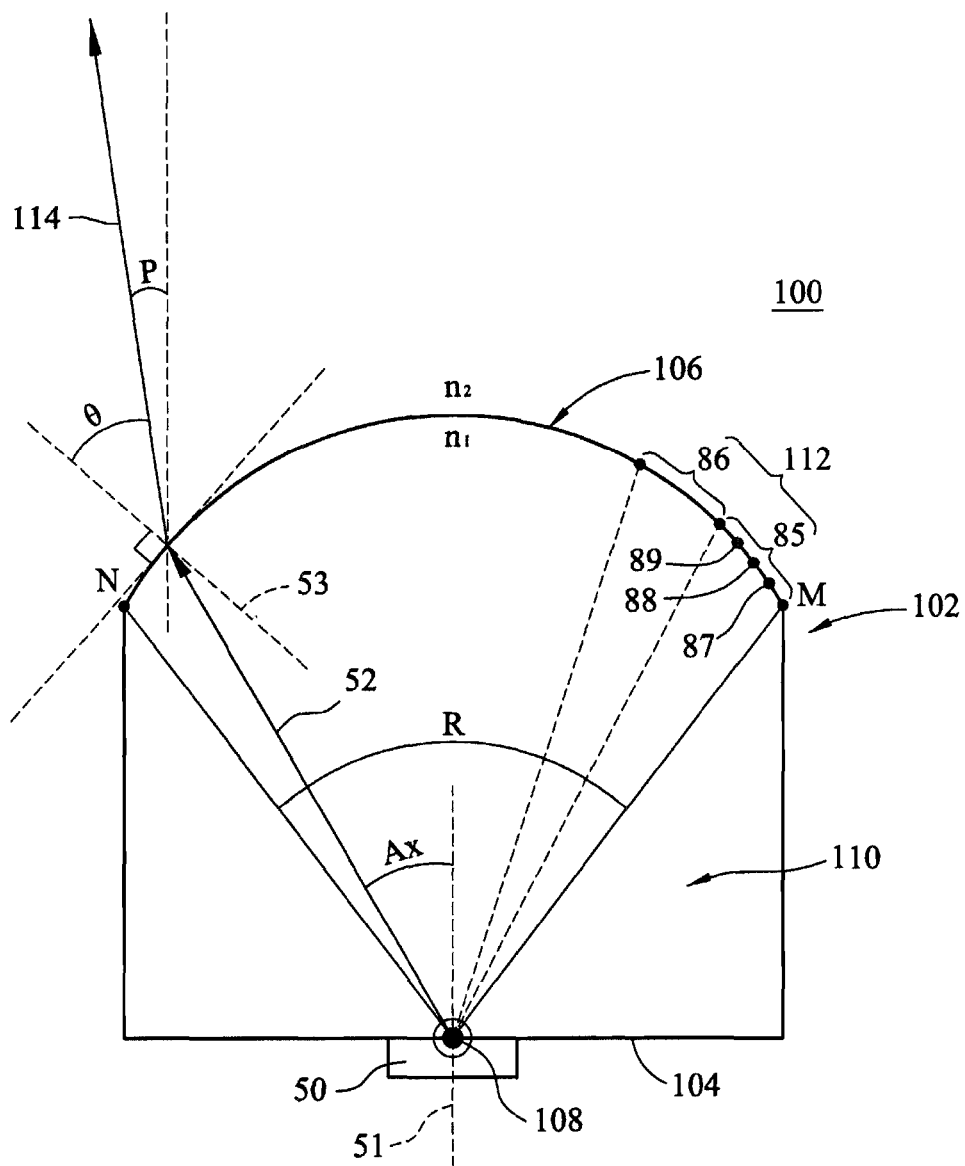
FIG. 1C is a schematic structural side view of FIG. 1A.

FIG. 1B and FIG. 1C are a schematic structural bottom view and a schematic structural side view of FIG. 1A. The light incident surface 104 comprises a central axis 108, and the light source 50 may be disposed on the central axis 108. The light source 50 emits the light 52, and the light incident surface 104 receives the light 52. In this embodiment, the light source 50 may be in contact with the light incident surface 104, which is not intended to limit the present invention, that is, the light source 50 may be separated from a light incident surface 104 for a distance.

The light emission curved surface 106 and a first plane 110 to which the central axis 108 is vertical are intersected to form a first curve 112. The first curve 112 has a plurality of first curve segments 85, 86, and each first curve segment (that is, the first curve segments 85, 86) comprises at least three first tangent points. For example, the first curve segment 85 comprises first tangent points 87, 88, 89. To avoid the complexity of FIG. 1C, only two first curve segments 85, 86 and first tangent points 87, 88, 89 are shown in FIG. 1C. In this embodiment, the first curve 112 is obtained in a curve fitting manner of the first tangent points which are taken at an interval of a predetermined degree. The predetermined degree may be but not limited to 1°, which is not intended to limit the present invention. After passing each first tangent point along a connecting line of the light source 50 and each first tangent point, the light 52 exits along a first collimation axis 114. An included angle P formed between the first collimation axis 114 and the optic axis 51 is greater than −15° and smaller than 15°, and each first tangent point satisfies a formula (1) in the following:

$$M_x = \tan\theta = \tan\left(\sin^{-1}\left(\frac{n_1}{n_2}\sin A_x\right)\right) \tag{1}$$

$M_x$ is a tangent slope (that is, tan θ) at each first tangent point, θ is an included angle formed between the first collimation axis 114 and a normal line 53 of each first tangent point, $A_x$ is an included angle formed between a connecting line of each first tangent point and a light source 50 and the optic axis 51, $n_1$ is a refractive index of the directional light distributing optical element 102, and $n_2$ is a refractive index of an ambient environment in which the directional light distributing optical element 102 is disposed. An included angle R formed between end points M, N of the first curve 112 and a light source 50 may be greater than 0° and smaller than 100°.

Figure 1D:
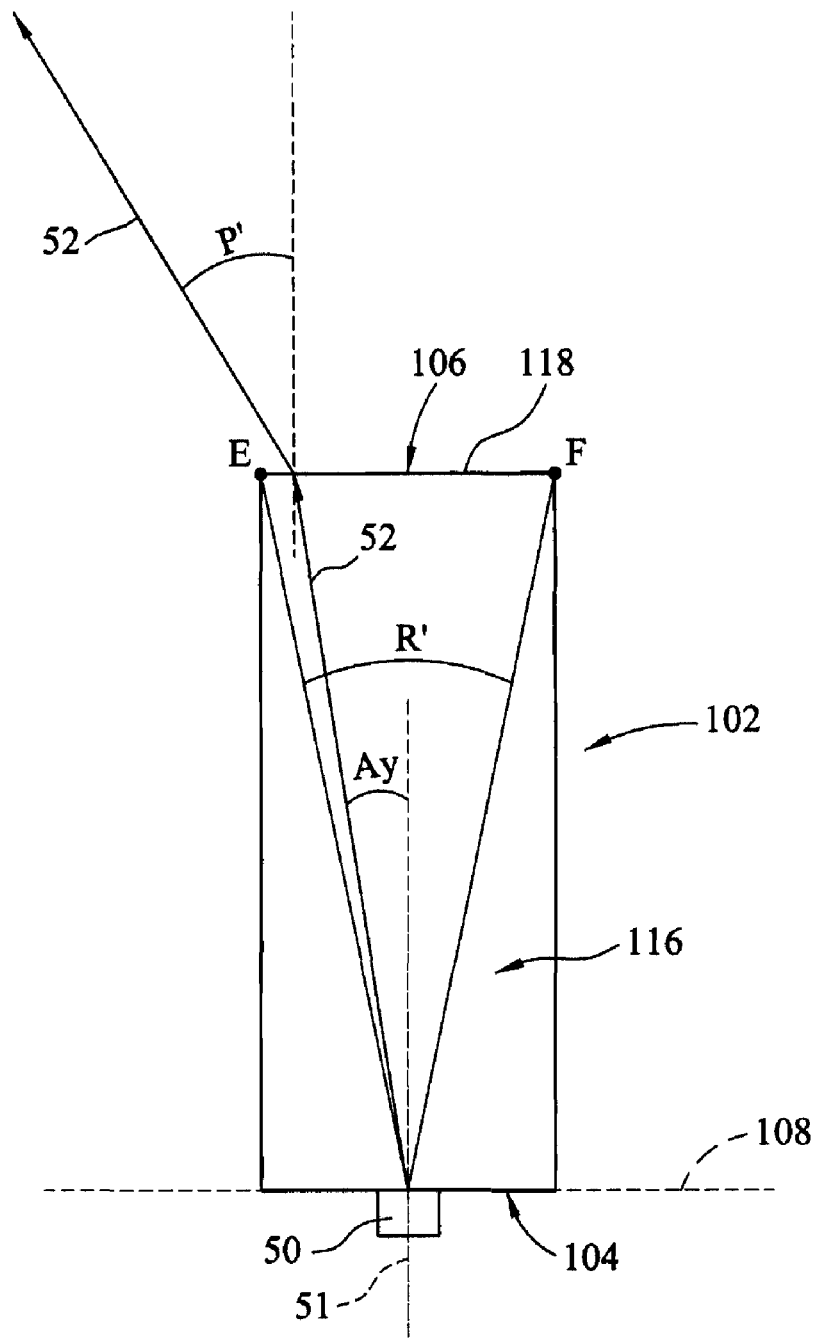
FIG. 1D is another schematic structural side view of FIG. 1A.

In this embodiment, the light emission curved surface 106 may be formed by the first curve 112 extending along the central axis 108. FIG. 1D is another schematic structural side view of FIG. 1A. The light emission curved surface 106 and a second plane 116 at which the central axis 108 is located are intersected to form a second curve 118, and an included angle R' formed between two end points E, F of the second curve 118 and a light source 50 is greater than 0° and smaller than 40°. In this embodiment, the light emission curved surface 106 may be formed by the first curve 112 extending along central axis 108, such that the second curve 118 is a straight line, and thus an included angle P' formed between the light 52 after passing through the second curve 118 and the optic axis 51 may be greater than or equal to 30°. Therefore, the light 52 after passing the directional light distributing optical assembly 100 may generate a one-dimensional directional light.

Figure 2:
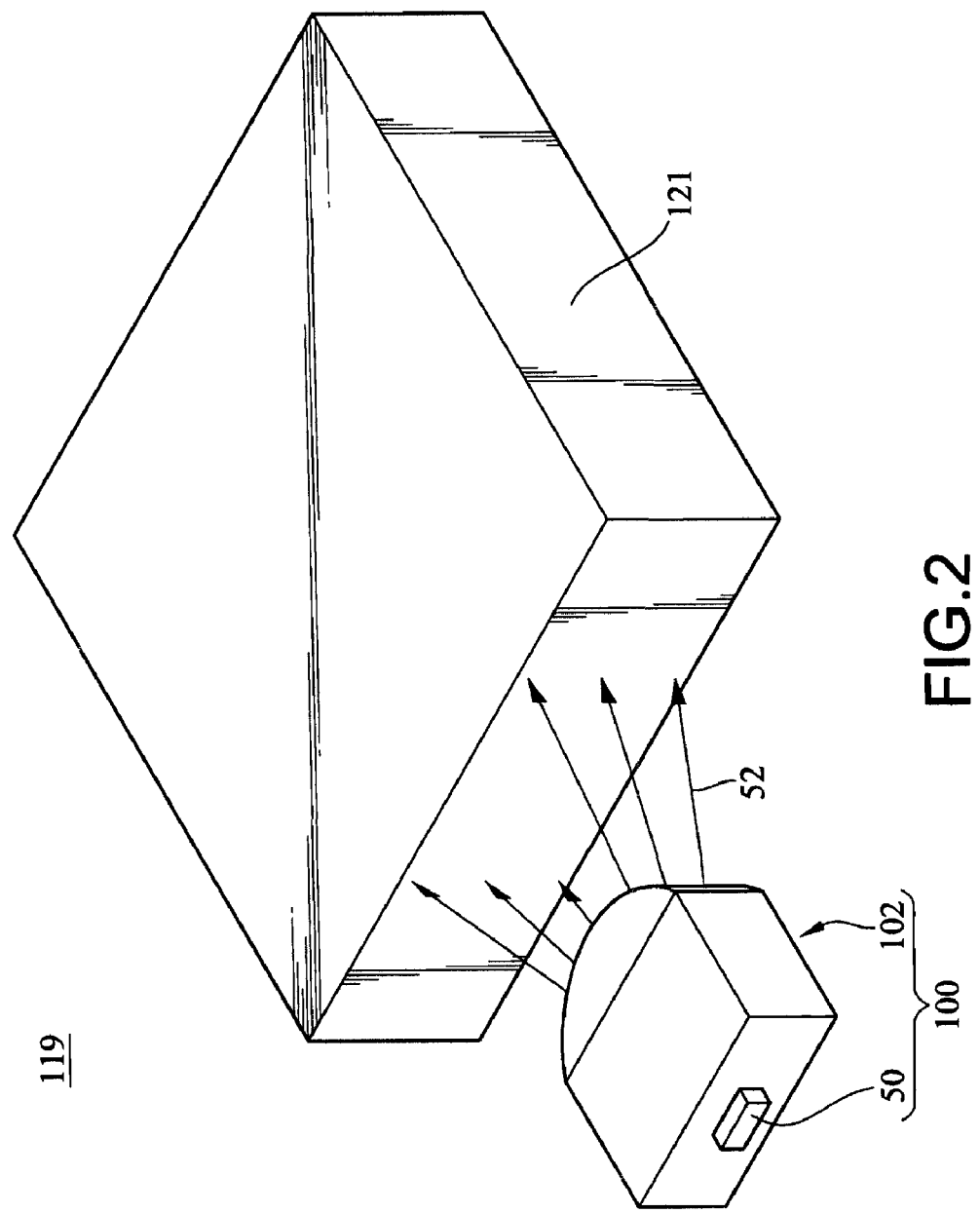
FIG. 2 is a schematic three-dimensional structural view of a directional light distributing optical assembly of FIG. 1A when being applied to a side-type backlight module according to an embodiment of the present invention.

Referring to FIG. 1C, FIG. 1D, and FIG. 2, FIG. 2 is a schematic three-dimensional structural view of a directional light distributing optical assembly of FIG. 1A when being applied to a side-type backlight module. When the directional light distributing optical assembly 100 is used as the light source of the side-type backlight module 119, an included angle P formed between the light 52 after passing the first curve 112 and the optic axis 51 is greater than −15° and smaller than 15°, and the included angle P' formed between the light 52 after passing the second curve 118 and the optic axis 51 may be greater than or equal to 30°, such that the light 52 after entering a directional light guide plate 121 of the side-type backlight module 119 may generate a uniform illumination. The included angle P is greater than −15° and smaller than 15°, such that the light 52 is directionally incident on the directional light guide plate 121, and the included angle P' is greater than or equal to 30°, such that the side-type backlight module 119 outputs the uniform illumination.

Figure 3:
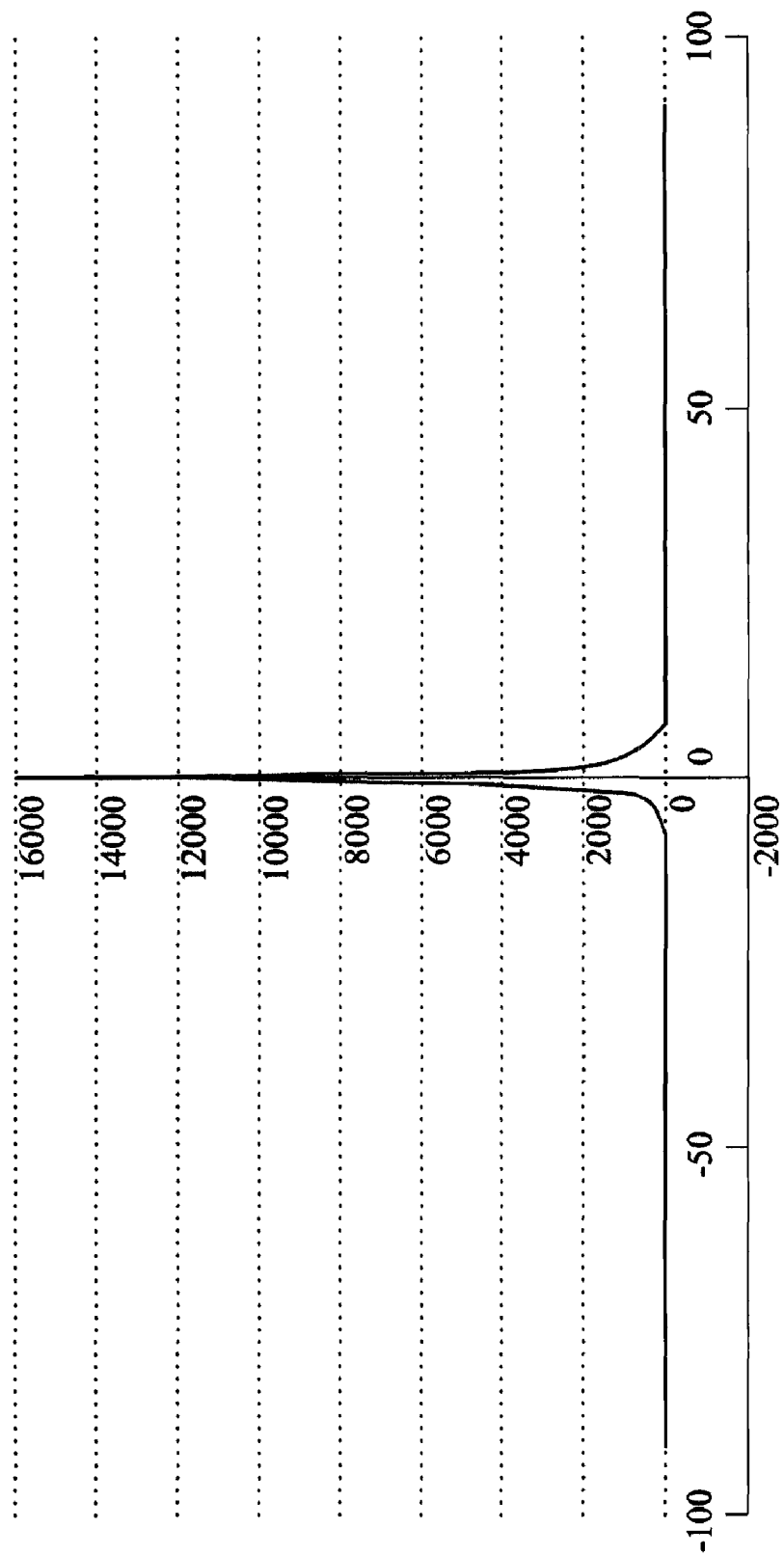
FIG. 3 is a schematic view of a relation of a view angle and a light intensity simulated according to FIG. 1A.
Figure 4:
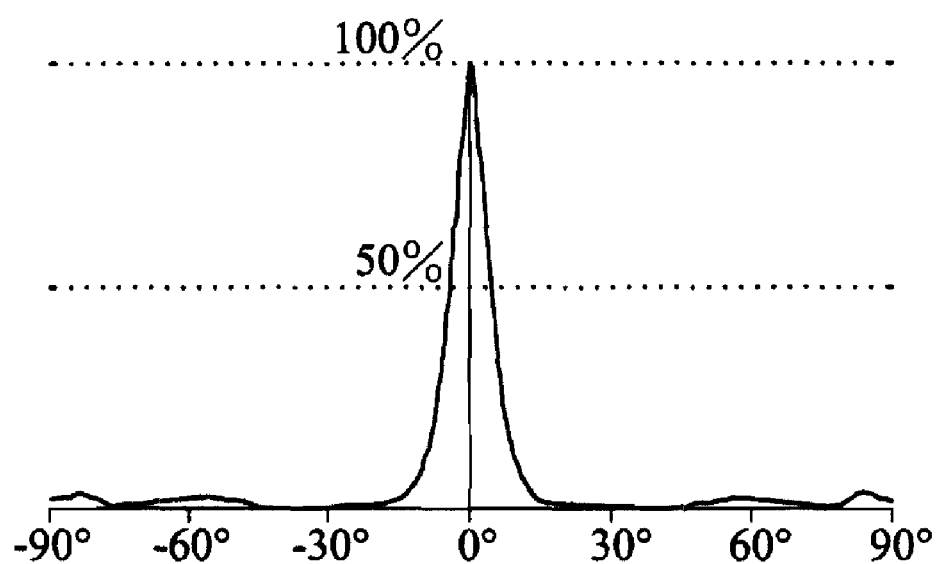
FIG. 4 is a schematic view of a relation of an view angle and a light intensity experimented according to FIG. 1A.

The following experiment is carried out according to FIG. 2. FIG. 3 and FIG. 4 are respectively schematic views of a relation of a view angle and a light intensity simulated and experimented according to FIG. 2. The schematic view of the relation of the view angle and the light intensity is obtained by the measurement of the light intensity at different view angles after the light 52 passes the directional light distributing optical element 102 and the directional light guide plate 121. From FIG. 3, it is known that the Full Width at Half Maximum (FWHM) of FIG. 3 is 1.8° (that is, the simulated FWHM of the directional light distributing optical assembly is 1.8°). From FIG. 4, the FWHM of FIG. 4 is 9.09° (that is, the practical FWHM of the directional light distributing optical assembly is 9.09°). It is known from the above that under the same parameters, the practically experimented and simulated FWHMs have great difference, and the error may be caused by the alignment relation of the light source 50 and the directional light distributing optical element 102, which is for example but not limited to the distance between the directional light distributing optical element 102 and the light source 50 or whether the optic axis 51 of the light source 50 and the optic axis (not shown) of the directional light distributing optical element 102 are located on the same plane vertical to the central axis 108.

Figure 5A:
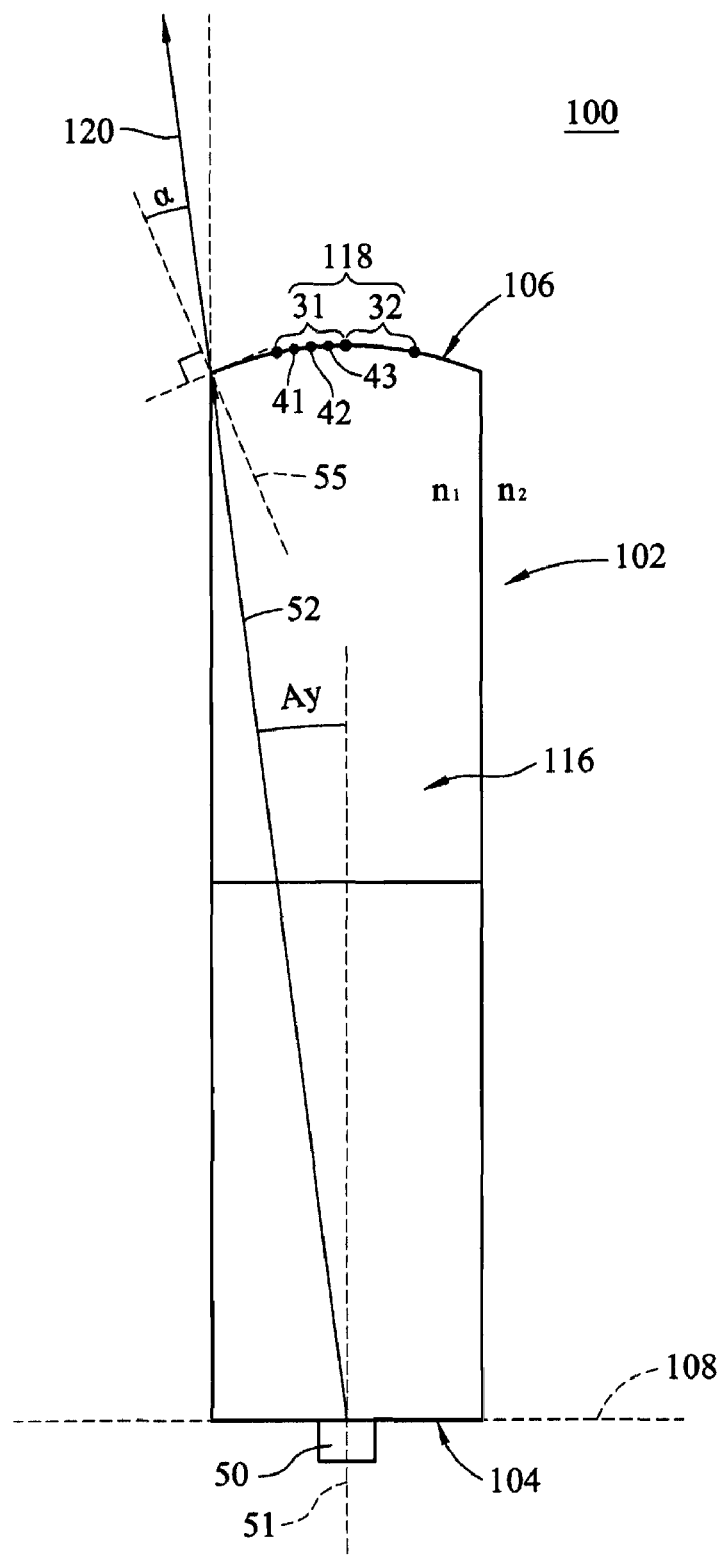
FIG. 5A is a schematic structural side view of a directional light distributing optical assembly according to another embodiment of the present invention.
Figure 5B:
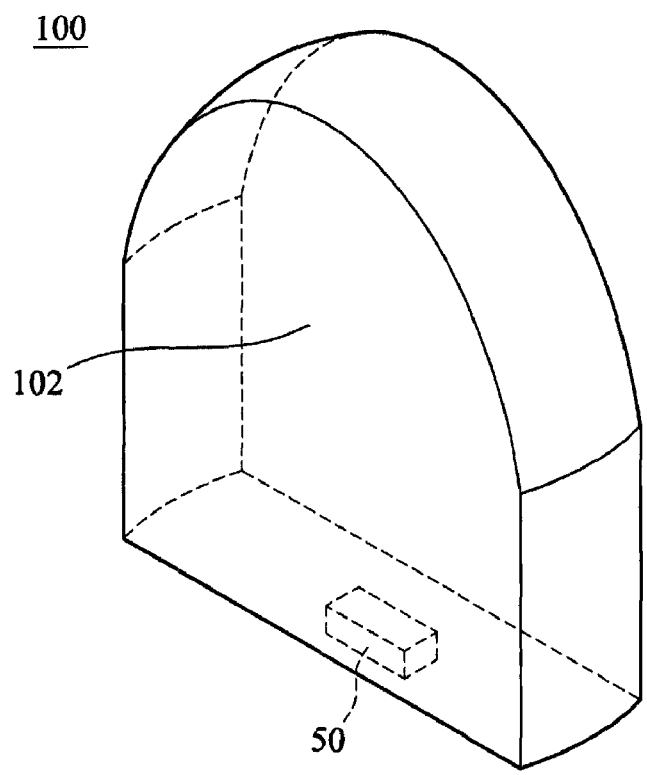
FIG. 5B is a schematic three-dimensional structural view of a directional light distributing optical assembly according to another embodiment of the present invention.

To reduce the difference between the practically experimented and simulated FWHMs, the influence of the relative relation of the light source 50 and the directional light distributing optical element 102 may be reduced, that is, the second curve 118 of the light emission curved surface 106 is processed. FIG. 5A and FIG. 5B are respectively a schematic structural side view and a schematic three-dimensional structural view of a directional light distributing optical assembly according to another embodiment of the present invention. The second curve 118 has a plurality of second curve segments 31, 32, and each second curve segment (that is, the second curve segments 31, 32) comprises at least three second tangent points. For example, the second curve segment 31 comprises second tangent points 41, 42, 43. To avoid the complexity of FIG. 5A and FIG. 5B, only two second curve segments 31, 32 and second tangent points 41, 42, 43 are shown in FIG. 5A and FIG. 5B. In this embodiment, the second curve 118 is obtained in a curve fitting manner of the second tangent points which are taken at an interval of a predetermined degree. The predetermined degree may be but not limited to 1°, which is not intended to limit the present invention. After passing each second tangent point along a connecting line of the light source 50 and each second tangent point, the light 52 exits along a second axis 120. An included angle formed between the second axis 120 and the optic axis 51 is greater than or equal to 30°, but is not limited to this. All the tangent points on each second curve satisfy a formula (2) in the following:

$$M_y = \tan\alpha = \tan\left(\sin^{-1}\left(\frac{n_1}{n_2}\sin A_y\right)\right) \quad (2)$$

$M_y$ is a tangent slope (that is, tan α) at each second tangent point on the second curve 118, α is an included angle formed between the second collimation axis 120 and a normal line 55 of each second tangent point, $A_y$ is an included angle formed between a connecting line of each second tangent point on the second curve 118 and a light source 50 and the optic axis 51, $n_1$ is a refractive index of the directional light distributing optical element 102, and $n_2$ is a refractive index of an ambient environment in which the directional light distributing optical element 102 is disposed.

Figure 6:
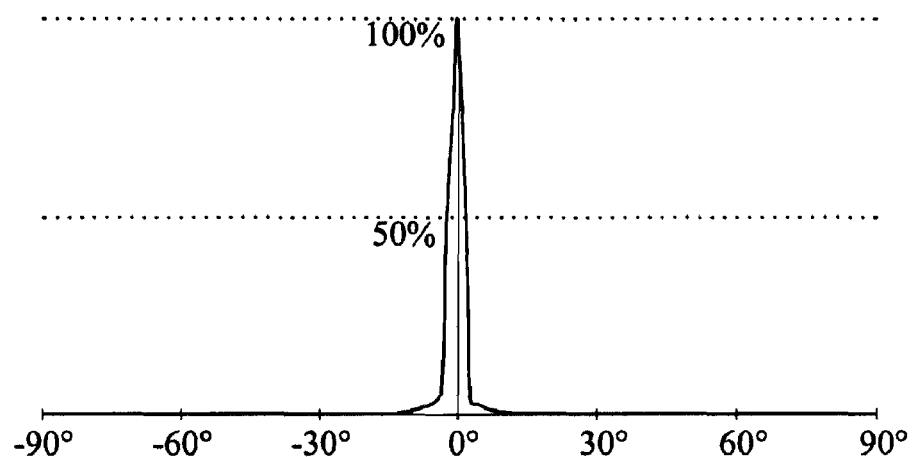
FIG. 6 is a schematic view of a relation of a view angle and a light intensity when the directional light distributing optical assembly of FIG. 5A is used to carry out the experiment.

Then, FIG. 6 is a schematic view of a relation of a view angle and a light intensity when the directional light distributing optical assembly of FIG. 5A is used to carry out the experiment. From FIG. 6, it is known that the FWHM of FIG. 6 is 3.89°. Therefore, it is known that when the second curve 118 changes from the straight line in FIG. 1D into the curve in FIG. 5A, the difference between the practically experimented and the simulated FWHMs may be effectively reduced and the alignment accuracy of the light source 50 and the directional light distributing optical element 102 may be improved.

Furthermore, to reduce the size of the directional light distributing optical element 102, the directional light distributing optical element 102 may be designed into the Fresnel lens shape. The detailed description may refer to FIG. 7A, FIG. 7B, and FIG. 7C, which are respectively a schematic three-dimensional structural view of a directional light distributing optical assembly according to another embodiment of the present invention, a schematic structural bottom view and a schematic structural side view of FIG. 7A. In this embodiment, the light sources 60, 70, 80 may be disposed on the central axis 108, in which the light source 60 may emit a red light, the light source 70 may emit a green light, and the light source 80 may emit a blue light, such that the directional light distributing optical assembly 300 may emit a white light, which is not intended to limit the present invention. It should be noted that each light source (that is, the light sources 60, 70, 80) needs to be disposed on the central axis 108 to avoid influencing the refraction effect of the directional light distributing optical assembly 300. In the following description of the light, the light 72 emitted by the light source 70 is taken as an example, and the lights emitted by the light sources 60, 80 may be deduced in the same manner.

Figure 7A:
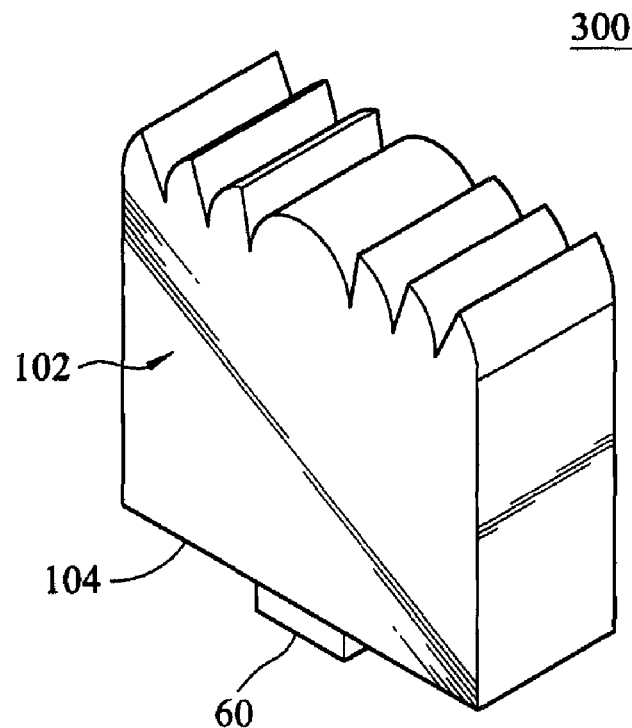
FIG. 7A is a schematic three-dimensional structural view of a directional light distributing optical assembly according to another embodiment of the present invention.
Figure 7B:
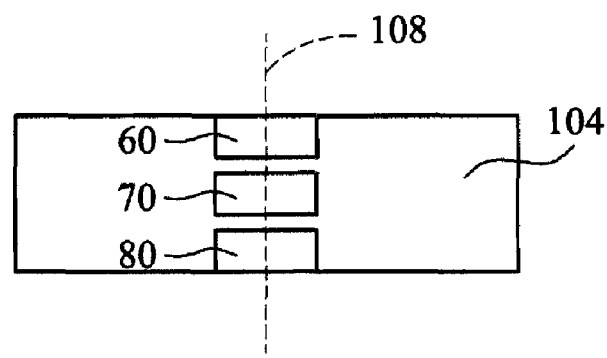
FIG. 7B is a schematic structural bottom view of FIG. 7A.
Figure 7C:
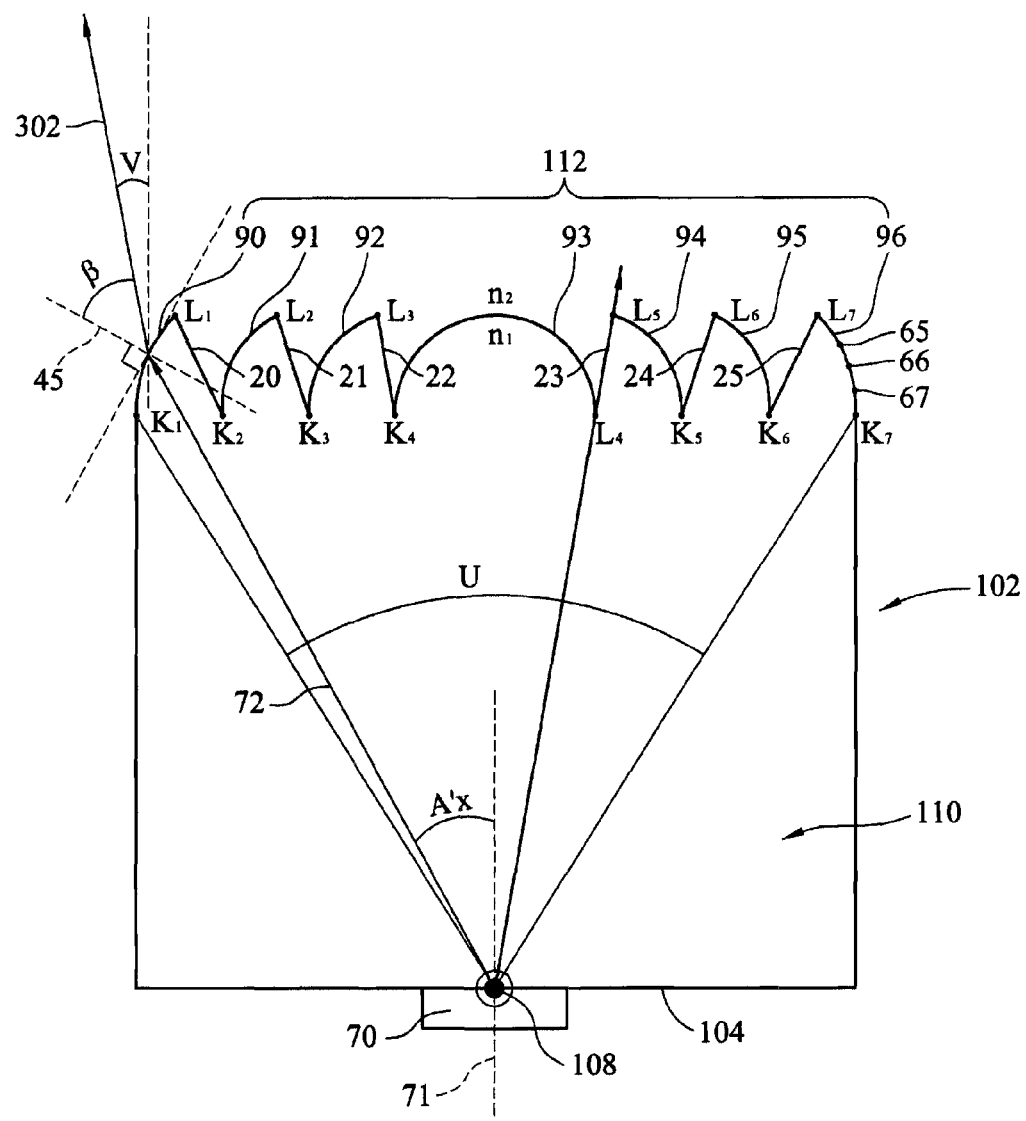
FIG. 7C is a schematic structural side view of FIG. 7A.

Referring to FIG. 7A and FIG. 7C, the directional light distributing optical assembly 300 comprises a structure of the directional light distributing optical assembly 100. The first curve 112 comprises seven first curve segments 90, 91, 92, 93, 94, 95, 96, and each first curve segment (that is, the first curve segments 90, 91, 92, 93, 94, 95, 96) comprises at least three first tangent points. For example, the first curve segment 96 comprises first tangent points 65, 66, 67 (to avoid the complexity of the drawings, the first tangent points on the first curve segments 90, 91, 92, 93, 94, 95 are not marked in FIG. 7A). After passing each first tangent point along a connecting line of the light source 70 and each first tangent point, the light 72 exits along the axis 302. The included angle V formed between the third axis 302 and an optic axis 71 is greater than −15° and smaller than 15°, and each first tangent point satisfies a formula (3) in the following:

$$M'_x = \tan\beta = \tan\left(\sin^{-1}\left(\frac{n_1}{n_2}\sin A'_x\right)\right) \quad (3)$$

$M'_x$ is a tangent slope (that is, tan β) at each first tangent point, β is an included angle formed between a third axis 302 and a normal line 45 of each first tangent point, $A'_x$ is an included angle formed between a connecting line of each first tangent point and a light source 70 and the optic axis 71, $n_1$ is a refractive index of the directional light distributing optical element 102, and $n_2$ is a refractive index of an ambient environment in which the directional light distributing optical element 102 is disposed. An included angle U formed between end points $K_1$, $K_7$ of the first curve 112 and a light source 70 may be greater than 0° and smaller than 100°.

The included angle between the connecting lines of two end points of each first curve segment and a light source 70 is greater than 0° and smaller than 15°. That is to say, the included angle between connecting lines of end points $K_1$, $L_1$ of the first curve segment 90 and the light source 70 is 6°. The included angle between connecting lines of end points $K_2$, $L_2$ of the first curve segment 91 and a light source 70 is 6°. The included angle between the connecting lines of end points $K_3$, $L_3$ of the first curve segment 92 and the light source 70 is 6°. The included angle between the connecting lines of end points $K_4$, $L_4$ of the first curve segment 93 and the light source 70 is 14°. The included angle between the connecting lines of end points $K_5$, $L_5$ of the first curve segment 94 and the light source 70 is 6°. The included angle between the connecting lines of end points $K_6$, $L_6$ of the first curve segment 95 and a light source 70 is 6°. The included angle between the connecting lines of end points $K_7$, $L_7$ of the first curve segment 96 and the light source 70 is 6°, which is not intended to limit the present invention. In practice, the included angle between the connecting lines of two end points of each first curve segment and the light source 70 may be adjusted according to the actual requirement. It should be noted that an included angle U formed between end points $K_1$, $K_7$ of the first curve 112 and a light source 70 may be greater than 0° and smaller than 100°.

In this embodiment, the first curve 112 may further comprise six connecting segments 20, 21, 22, 23, 24, 25, and each connecting segment (that is, the connecting segments 20, 21, 22, 23, 24, 25) connects two adjacent first curve segments. That is to say, the connecting segment 20 connects the first curve segment 90 and the first curve segment 91 (that is, the end points $L_1$ and $K_2$). The connecting segment 21 connects the first curve segment 91 and the first curve segment 92 (that is, the end points $L_2$ and $K_3$). The connecting segment 22 connects the first curve segment 92 and the first curve segment 93 (that is, the end points $L_3$ and $K_4$). The connecting segment 23 connects the first curve segment 93 and the first curve segment 94 (that is, the end points $L_4$ and $L_5$). The connecting segment 24 connects the first curve segment 94 and the first curve segment 95 (that is, the end points $K_5$ and $L_6$). The connecting segment 25 connects the first curve segment 95 and the first curve segment 96 (that is, the end points $K_6$ and $L_7$). Each connecting segment (that is, the connecting segments 20, 21, 22, 23, 24, 25) is substantially parallel to the connecting line of an end point of each connecting segment (that is, the connecting segments 20, 21, 22, 23, 24, 25) and the light source 70. In other words, the connecting segment 20 is substantially parallel to the connecting line of the end point $K_2$ and the light source 70. The connecting segment 21 is substantially parallel to the connecting line of the end point $K_3$ and the light source 70. The connecting segment 22 is substantially parallel to the connecting line of the end point $K_4$ and the light source 70. The connecting segment 23 is substantially parallel to the connecting line of the end point $L_4$ and the light source 70. The connecting segment 24 is substantially parallel to the connecting line of the end point $K_5$ and the light source 70. The connecting segment 25 is substantially parallel to the connecting line of the end point $K_6$ and the light source 70.

The material of the directional light distributing optical element 102 may be Polyethylene terephthalate (PET), Polymethyl methacrylate (PMMA), Poly-Styrenics (PS), Poly Carbonate (PC), or glass, and may also be adjusted according to the actual requirement.

The directional light distributing optical element according to the present invention may use the first curve design and the light emission curved surface forming manner to make the light emitted by the light source pass the directional light distributing optical element and then generate a one-dimensional directional light. The second curve design may reduce the alignment error of the light source and the directional light distributing optical element and may further reduce the FWHM of the directional light distributing optical assembly. The light emission curved surface is designed into the Fresnel lens to reduce the volume of the directional light distributing optical element, such that the directional light distributing optical assembly may be applied to the small devices.

What is claimed is:

1. A directional light distributing optical element, for receiving a light emitted by a light source comprising an optic axis, the directional light distributing optical element comprising:
a light incident surface, for receiving the light and comprising a central axis; and
a light emission curved surface, intersected with a first plane being vertical to the central axis to form a first curve, wherein the first curve has a plurality of first curve segments, each first curve segment comprises at least three first tangent points, and after passing each first tangent point along a connecting line of the light source and each first tangent point, the light exits along a first axis, an included angle formed between the first axis and the optic axis is greater than −15° and smaller than 15°, and each first tangent point satisfies a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, $\theta$ is an included angle formed between the first axis and a normal line of each first tangent point, $A_x$ is an included angle formed between the connecting line of each first tangent point and the light source and the optic axis, $n_1$ is a refractive index of the directional light distributing optical element, and $n_2$ is a refractive index of an ambient environment in which the directional light distributing optical element is disposed.

2. The directional light distributing optical element according to claim 1, wherein an included angle formed between connecting lines of two end points of each first curve segment and the light source is greater than 0° and smaller than 15°.

3. The directional light distributing optical element according to claim 1, wherein the light emission curved surface is formed by the first curve extending along the central axis.

4. The directional light distributing optical element according to claim 1, wherein an included angle formed between two end points of the first curve and the light source is greater than 0° and smaller than 100°.

5. The directional light distributing optical element according to claim 1, wherein the light emission curved surface and a second plane at which the central axis is located are intersected to form a second curve, an included angle formed between two end points of the second curve and the light source is greater than 0° and smaller than 40°, and the light emission curved surface is formed by the first curve extending along the central axis, such that the second curve is a straight line.

6. The directional light distributing optical element according to claim 5, wherein an included angle formed between the light after passing the second curve and the optic axis is greater than or equal to 30°.

7. The directional light distributing optical element according to claim 1, wherein the light emission curved surface and a second plane at which the central axis is located are intersected to form a second curve, an included angle formed between two end points of the second curve and the light source is greater than 0° and smaller than 40°, the second curve has a plurality of second curve segments, each second curve segment comprises at least three second tangent points, and after passing each second tangent point along a connecting line of the light source and each second tangent point, the light exits along a second axis, with each second tangent point satisfying a formula in the following:

$$M_y = \tan\alpha = \tan\left(\sin^{-1}\left(\frac{n_1}{n_2}\sin A_y\right)\right)$$

wherein $M_y$ is a tangent slope at each second tangent point, $\alpha$ is an included angle formed between the second axis and a normal line of each second tangent point, $A_y$ is an included angle formed between a connecting line of each second tangent point and the light source and the optic axis, $n_1$ is a refractive index of the directional light distributing optical element, and $n_2$ is a refractive index of an ambient environment in which the directional light distributing optical element is disposed.

8. The directional light distributing optical element according to claim 7, wherein an included angle formed between the second axis and the optic axis is greater than or equal to 30°.

9. The directional light distributing optical element according to claim 1, wherein the first curve comprises a plurality of connecting segments, each connecting segment connects two adjacent first curve segments, and each connecting segment is substantially parallel to a connecting line of an end point of each connecting segment and the light source.

10. A directional light distributing optical assembly, comprising:
at least one light source, for providing a light and comprising an optic axis; and
a directional light distributing optical element, comprising:
a light incident surface, for receiving the light and comprising a central axis; and
a light emission curved surface, intersected with a first plane being vertical to the central axis to form a first curve, wherein the first curve has a plurality of first curve segments, each first curve segment comprises at least three first tangent points, and after passing each first tangent point along a connecting line of the light source and each first tangent point, the light exits along a first axis, an included angle formed between the first axis and the optic axis is greater than −15° and smaller than 15°, with each first tangent point satisfying a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, $\theta$ is an included angle formed between the first axis and a normal line of each first tangent point, $A_x$ is an included angle formed between the connecting line of each first tangent point and the light source and the optic axis, $n_1$ is a refractive index of the directional light distributing optical element, and $n_2$ is a refractive index of an ambient environment in which the directional light distributing optical element is disposed.

11. The directional light distributing optical assembly according to claim 10, wherein an included angle formed between connecting lines of two end points of each first curve segment and the light source is greater than 0° and smaller than 15°.

12. The directional light distributing optical assembly according to claim 10, wherein the light emission curved surface is formed by the first curve extending along the central axis.

13. The directional light distributing optical assembly according to claim 10, wherein an included angle formed between two end points of the first curve and the light source is greater than 0° and smaller than 100°.

14. The directional light distributing optical assembly according to claim 10, wherein the light emission curved surface and a second plane at which the central axis is located are intersected to form a second curve, an included angle formed between two end points of the second curve and the light source is greater than 0° and smaller than 40°, and the light emission curved surface is formed by the first curve extending along the central axis, such that the second curve is a straight line.

15. The directional light distributing optical assembly according to claim 14, wherein an included angle formed between the light after the light passes the second curve and the optic axis is greater than or equal to 30°.

16. The directional light distributing optical assembly according to claim 10, wherein the light emission curved surface and a second plane at which the central axis is located are intersected to form a second curve, an included angle formed between two end points of the second curve and the light source is greater than 0° and smaller than 40°, the second curve has a plurality of second curve segments, each second curve segment comprises at least three second tangent points, and after passing each second tangent point along a connecting line of the light source and each second tangent point, the light exits along a second axis, with each second tangent point satisfying a formula in the following:

$$M_y = \tan\alpha = \tan\left(\sin^{-1}\left(\frac{n_1}{n_2}\sin A_y\right)\right)$$

wherein $M_y$ is a tangent slope at each second tangent point of the second curve, $\alpha$ is an included angle formed between the second axis and the normal line, $A_y$ is an included angle formed between a connecting line of each second tangent point of the second curve and the light source and the optic axis, $n_1$ is a refractive index of the directional light distributing optical element, and $n_2$ is a refractive index of the ambient environment in which the directional light distributing optical element is disposed.

17. The directional light distributing optical assembly according to claim 16, wherein an included angle formed between the second collimation axis and the optic axis is greater than or equal to 30°.

18. The directional light distributing optical assembly according to claim 10, wherein the first curve comprises a plurality of connecting segments, each connecting segment connects two adjacent first curve segments, and each connecting segment is substantially parallel to a connecting line of an end point of each connecting segment and the light source.

* * * * *